Patented Nov. 27, 1934

1,982,536

UNITED STATES PATENT OFFICE 1,982,536

PRODUCING OLEFINES

Granville A. Perkins, South Charleston, W. Va., assignor to Carbide and Carbon Chemicals Corporation, a corporation of New York No Drawing. Application January 20, 1932, Serial No. 587,812

6 Claims. (Cl. 260—170)

The invention relates to unsaturated hydrocarbons, and their derivatives, containing at least one olefinic double bond to the molecule. The chief object of the invention is to provide a method whereby conjugated diolefinic double bonds may be reduced to olefinic double bonds by hydrogenation, without the formation of large quantities of the corresponding entirely saturated substance.

Thus, for example, I contemplate hydrogenating 1,3-butadiene to butylenes, according to reactions of the type:

$$C_4H_6 + H_2 \rightarrow C_4H_8$$

without concurrently forming great amounts of butane. Similarly I propose to hydrogenate pentadienes to amylenes without forming large amounts of pentanes; and in like manner to hydrogenate any compound containing one or more of the groups:

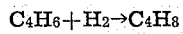

whereby one or more of the said groups react with hydrogen in such manner that each group so reacting combines with two and only two atoms of hydrogen to yield the group:

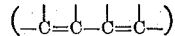

or the group:

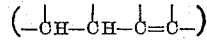

It has heretofore been impossible by known methods to effect such hydrogenation of conjugated double bonds of the above type without concurrently producing a large proportion of the corresponding fully saturated compounds. I have discovered that hydrocarbons containing at least one pair of conjugated diolefinic double bonds may be hydrogenated to yield compounds containing one olefinic double bond for each pair of conjugated double bonds in the original hydrocarbon, without the concurrent production of large amounts of the corresponding completely saturated compounds, by effecting the hydrogenation in the presence of metallic copper as a catalyst.

I prefer to use finely divided metallic copper as my catalyst, and I have discovered that improved results are secured when some finely divided chromium is also present. For example, a suitable catalyst may be prepared by impregnating an inert porous carrier such as porous silica with a solution of copper nitrate, or with a solution containing a mixture of copper nitrate and chromium nitrate, roasting the impregnated carrier in air to convert the nitrates to oxides, and finally reducing the oxides by treating with hydrogen at an elevated temperature such as 250° C. Other suitable methods of preparing the catalyst may of course be applied, for instance by modifying known methods.

The hydrogenation process according to the invention is carried out in the vapor phase, suitably at a temperature between about 200° C. and about 300° C., preferably at about 250° C. The vaporized material which is to be hydrogenated is mixed with hydrogen, and the mixture is passed through the catalyst. The hydrogen should preferably be present in slight excess of the theoretical requirement.

Experiments which I have made demonstrate the efficiency of the process of my invention, and include the following examples:

*Example 1.*—A catalyst was prepared by impregnating pieces of porous silica, sized between about 2 and 4 mesh, with a solution of copper nitrate. The impregnated pieces were then roasted in the air, whereby the nitrate was converted to the oxide, and finally, the oxide was reduced to finely divided copper metal by treating with hydrogen at about 250° C. The catalyst so prepared contained about 6% of copper. 150 grams of this catalyst was placed in a container, heated to about 250° C., and a mixture of 1,3-butadiene and hydrogen containing substantially equal volumes of the diolefine and hydrogen was passed through the catalyst at a rate of approximately 30 liters per hour. The product was freed from hydrogen by condensing the hydrocarbons, and the condensate was found to comprise 65% of butylenes, 34% of unconverted butadiene, and 1% of butane.

An experiment wherein the conditions were entirely comparable, with the exception that nickel was used instead of copper as a catalyst, yielded a product comprising 74% of butylenes, 16% of butadiene, and 10% of butane.

*Example 2.*—A catalyst was prepared in a manner similar to that used in Example 1, but using as the impregnating fluid a solution containing copper nitrate and chromium nitrate. The prepared and reduced catalyst contained about 6% of copper and about 0.2% of chromium.

One hundred and fifty grams of this catalyst was placed in a container, heated to about 250° C., and a mixture of butadiene and hydrogen was passed through it, the rate of flow of butadiene and hydrogen being 10 and 12 liters per hour respectively. After the first hour of operation the product contained no recognizable amounts of butane. The product was freed from hydrogen by condensing the hydrocarbons, and the condensate so produced consisted of 92% butylenes and 8% unchanged butadiene.

*Example 3.*—Butadiene in admixture with hydrogen was passed through 150 grams of a catalyst prepared as in Example 2, at the hourly rate of 3 liters of the diolefine and 3.5 liters of hydrogen. The product, when freed from hydrogen, consisted of 99% of butylenes an 1% of unchanged butadiene. There was no detectable amount of butane formed.

*Example 4.*—A mixture containing 26% of butadiene, and 19% of butane, the remainder being a mixture of butylenes, was passed through a catalyst prepared as in Example 2 at a rate of 0.8 liters per hour in admixture with hydrogen at 0.4 liters per hour. The product, when freed from hydrogen, consisted of 80.7% butylenes, 19% butane, and 0.3% of unchanged butadiene.

*Example 5.*—A mixture containing 15% of pentadienes of the conjugated type and including isoprene, and 16% of pentanes, the remainder being a mixture of amylenes, was hydrogenated under conditions identical with those in Example 4. The product, after the removal of hydrogen, consisted of 83.6% of amylenes, 16% of pentanes, and 0.4% of unchanged pentadienes.

The catalysts used in these examples may be revivified when they become less active after long use. I have found that by oxidizing the metals with air or steam at an elevated temperature such as 250° C., and subsequently reducing the oxides with hydrogen at about 250° C., the revivified catalysts are substantially as active as the original freshly-prepared material.

Although I have herein given illustrative examples of applications of my discovery, it is clear that I should not be limited to the specific compounds or by the specific physical conditions given therein. The olefinic and diolefinic double bonds referred to are those between carbon atoms, and do not include carbonyl or other double bonds.

I claim:

1. Method of producing olefine hydrocarbons which comprises hydrogenating aliphatic hydrocarbons containing a conjugated double bond in the presence of metallic copper.

2. Method of producing olefine hydrocarbons which comprises hydrogenating aliphatic hydrocarbons containing a conjugated double bond in the presence of metallic copper and chromium.

3. Method of producing olefine hydrocarbons which comprises hydrogenating aliphatic hydrocarbons containing a conjugated double bond in the presence of metallic copper and chromium supported on an inert porous material.

4. Method of producing olefine hydrocarbons which comprises hydrogenating aliphatic hydrocarbons containing a conjugated double bond in the presence of metallic copper and chromium supported on an inert porous material at a temperature of about 200° to about 300° C.

5. Process for producing butylenes which comprises passing a gas mixture containing hydrogen and butadiene into a vessel which contains a catalyst consisting of metallic copper and chromium and heating to a temperature between about 200° C. and about 300° C.

6. Process for hydrogenating isoprene by the addition of two and only two hydrogen atoms to each isoprene molecule which comprises passing a gas mixture containing hydrogen and isoprene into a vessel which contains a catalyst consisting of metallic copper and chromium supported on an inert porous material, and heating to a temperature between about 200° C. and 300° C.

GRANVILLE A. PERKINS.